United States Patent
Shashoua et al.

(10) Patent No.: US 11,997,154 B1
(45) Date of Patent: May 28, 2024

(54) SYSTEMS AND METHODS FOR VISUALIZING DIGITAL CONTENT

(71) Applicant: Zive, Inc., Stamford, CT (US)

(72) Inventors: Eric Shashoua, Stamford, CA (US); Pall Ivarsson, Manhattan Beach, CA (US); Anton Zmieiev, Reshetylivka (UA); Ryan Shetley, Cape Girardeau, MO (US)

(73) Assignee: ZIVE, INC., Stamford, CT (US)

( * ) Notice: Subject to any disclaimer, the term of this patent is extended or adjusted under 35 U.S.C. 154(b) by 0 days.

(21) Appl. No.: 17/092,508

(22) Filed: Nov. 9, 2020

Related U.S. Application Data

(60) Provisional application No. 62/934,507, filed on Nov. 12, 2019.

(51) Int. Cl.
  H04L 67/02 (2022.01)
  G06F 3/04842 (2022.01)
  H04L 41/22 (2022.01)

(52) U.S. Cl.
  CPC .......... H04L 67/02 (2013.01); G06F 3/04842 (2013.01); H04L 41/22 (2013.01)

(58) Field of Classification Search
  CPC ...... H04L 67/02; H04L 41/22; G06F 3/04842
  See application file for complete search history.

(56) References Cited

U.S. PATENT DOCUMENTS

| | | | | |
|---|---|---|---|---|
| 6,266,681 B1* | 7/2001 | Guthrie | ............... | G06F 9/44526 715/234 |
| 6,490,602 B1* | 12/2002 | Kraemer | ............... | G06Q 30/06 715/236 |
| 6,701,368 B1* | 3/2004 | Chennapragada | ...... | H04L 29/06 709/202 |
| 7,136,896 B1* | 11/2006 | Srinivas | .................. | G06F 40/14 709/203 |
| 7,533,386 B2* | 5/2009 | Coker | ....................... | G06F 9/54 717/115 |
| 7,853,933 B2* | 12/2010 | Coker | ....................... | G06F 8/36 717/136 |
| 7,941,491 B2* | 5/2011 | Sood | ....................... | H04L 51/12 709/206 |
| 8,584,147 B2* | 11/2013 | Kothari | ................... | G06F 9/541 719/328 |

(Continued)

Primary Examiner — Jeremy L Stanley
(74) Attorney, Agent, or Firm — WILSON SONSINI GOODRICH & ROSATI

(57) ABSTRACT

Disclosed are systems and methods for visualizing digital content of a web-based application. The method comprises: (a) injecting a user interface component and a backend component into the web-based application; (b) rendering the web-based application with the user interface component, and the user interface component comprises a plurality of graphical elements and each of the plurality of graphical elements corresponds to a parameter of property of the digital content; (c) receiving an input from a user via at least one of the plurality of graphical elements to alter a state of the corresponding parameter in the backend component, and each of the plurality of graphical elements corresponds to multiple states of said corresponding parameter; and (d) updating a display of the digital content within the web-based application according to the state and the parameter.

20 Claims, 17 Drawing Sheets

(56) References Cited

U.S. PATENT DOCUMENTS

| | | | | |
|---|---|---|---|---|
| 8,930,806 | B2* | 1/2015 | Reyes | G06F 16/958 |
| | | | | 715/234 |
| 9,420,106 | B1* | 8/2016 | Thirugnanasundaram | |
| | | | | H04M 3/5232 |
| 9,454,410 | B2* | 9/2016 | Meijer | G06F 9/541 |
| 10,452,359 | B2* | 10/2019 | Valtchev | G06F 9/451 |
| 10,489,041 | B1* | 11/2019 | Edwards | G06F 8/38 |
| 10,534,783 | B1* | 1/2020 | Raczko | G06F 16/248 |
| 2002/0107925 | A1* | 8/2002 | Goldschneider | H04L 51/12 |
| | | | | 709/206 |
| 2003/0187937 | A1* | 10/2003 | Yao | H04L 51/34 |
| | | | | 709/206 |
| 2003/0229717 | A1* | 12/2003 | Teague | H04L 51/36 |
| | | | | 709/246 |
| 2003/0233419 | A1* | 12/2003 | Beringer | G06Q 10/107 |
| | | | | 709/206 |
| 2004/0078446 | A1* | 4/2004 | Daniell | H04L 63/102 |
| | | | | 709/206 |
| 2005/0267944 | A1* | 12/2005 | Little | G06Q 10/107 |
| | | | | 709/207 |
| 2006/0053279 | A1* | 3/2006 | Coueignoux | H04L 63/0823 |
| | | | | 713/154 |
| 2006/0136420 | A1* | 6/2006 | Gandhi | G06Q 10/107 |
| 2007/0061306 | A1* | 3/2007 | Pell | G06F 16/951 |
| 2007/0079247 | A1* | 4/2007 | Carignan | G06F 3/0481 |
| | | | | 715/745 |
| 2007/0226204 | A1* | 9/2007 | Feldman | G06F 16/30 |
| | | | | 707/999.005 |
| 2008/0077571 | A1* | 3/2008 | Harris | G06F 16/951 |
| 2010/0169320 | A1* | 7/2010 | Patnam | H04L 51/34 |
| | | | | 707/737 |
| 2010/0169363 | A1* | 7/2010 | Gaedcke | G06F 16/9535 |
| | | | | 707/769 |
| 2012/0109986 | A1* | 5/2012 | Palermiti, II | G06F 16/3328 |
| | | | | 707/754 |
| 2013/0007633 | A1* | 1/2013 | Cohen | G06Q 10/107 |
| | | | | 715/752 |
| 2013/0262447 | A1* | 10/2013 | MacLaurin | G06F 16/9535 |
| | | | | 707/722 |
| 2014/0067367 | A1* | 3/2014 | Simmons | G10L 15/30 |
| | | | | 704/8 |
| 2014/0082521 | A1* | 3/2014 | Carolan | H04L 51/36 |
| | | | | 715/752 |
| 2014/0137222 | A1* | 5/2014 | Nguyen | G06F 21/604 |
| | | | | 726/7 |
| 2014/0297759 | A1* | 10/2014 | Mody | H04L 51/08 |
| | | | | 709/206 |
| 2014/0310256 | A1* | 10/2014 | Olsson | G06F 16/436 |
| | | | | 707/706 |
| 2015/0088932 | A1* | 3/2015 | Sauz | G09B 19/00 |
| | | | | 707/779 |
| 2015/0195233 | A1* | 7/2015 | Ramanathan | H04L 51/18 |
| | | | | 709/207 |
| 2016/0011757 | A1* | 1/2016 | Hoffman | G06Q 10/10 |
| | | | | 715/752 |
| 2017/0053329 | A1* | 2/2017 | Bowers | G06Q 30/0609 |
| 2017/0126608 | A1* | 5/2017 | Friend | H04L 51/22 |
| 2017/0161253 | A1* | 6/2017 | Silver | H04L 67/02 |
| 2017/0357394 | A1* | 12/2017 | Jon | G06F 3/04847 |
| 2018/0006983 | A1* | 1/2018 | Steplyk | H04L 51/12 |
| 2018/0232441 | A1* | 8/2018 | Lin | G06F 16/353 |
| 2019/0379621 | A1* | 12/2019 | Ichikawa | G16H 10/40 |

* cited by examiner

SYSTEMS AND METHODS FOR VISUALIZING DIGITAL CONTENT

CROSS-REFERENCE TO RELATED APPLICATIONS

This application claims the priority and benefit of U.S. Provisional Application No. 62/934,507, filed on Nov. 12, 2019, the entirety of which is incorporated herein by reference.

BACKGROUND

Hundreds of millions of dollars have been spent in the form of public acquisitions alone by each of the top tech companies with email products to create new user interface methods of serving the user with a refined list of only those emails that are the most relevant to the user. This does not include the extensive cost and effort of these companies' internal efforts. Innovations and features over many years have been applied towards a single goal, which is to serve users with a smaller set of emails that are more relevant to them, and filter out those that are less so.

However, there are limitations and drawbacks of the existing methods or approaches. For instance, in the approaches that are made to create a new inbox view, it may take multiple steps and save an inbox view. The user interface often requires the user to go into settings or other locations and "save" an inbox view according to a pre-defined set of criteria. The user may not be able to quickly and dynamically change the inbox view spontaneously and quickly as in the interface. In some cases, "saving" inbox views may limit the user from freely redefining their inbox view on the fly, and the entire products have been built around a given view and the user may be unable to customize it.

Additionally, some existing approaches may require a user to define an inbox view by setting many factors at once increasing the burden on the users. In some cases, the user can save these results to labels or defined filters, which additionally proves highly complex for the average user who first needs to have the capability to create this search string. Further, saving these searches still requires the user to create the search string initially, returning to the same limiting factors of a complex user interface. Some interfaces may provide search functionality for the user to search for and filter message results. The drawback and inefficiency of such tools is that it requires users knowingly entering a number of search parameters and, often, syntax for those parameters, which can be beyond the ability of an average user, that often requires inputting a long string of text to achieve the search results.

Some companies may employ artificial intelligence (AI) technique to automatically filter emails that are relevant to a user. For example, important messages may be shown at the top of the inbox depending on artificial intelligence to determine which emails are most relevant to the user. However, this limit the capabilities for the user to customize or define the important messages. Furthermore, current artificial intelligence methods can be of limited efficiency, and may be prone to a high degree of "false positives" and "false negatives" that any user may have to continually switch between the AI-selected messages and those that are not, resulting in an unsatisfied user experience.

Some user interfaces may attempt to facilitate the user finding what's most relevant to them by applying multiple different flags to messages manually, or with the definition of complex filters to automatically apply the flags. For example, the existing user interface may allow users to create more than ten different flags that can be applied to messages, including a limitless number of visual "labels" that can be applied to them in addition to flags. However, such interface may require the user to take many steps to apply a variety of possible flags to each message, or be highly conversant with creating complex searches and using those to create filters which automatically apply these flags, resulting in a user interface with comprised user experience. Some interfaces may allow the user to sort messages into various folders to help them find messages of different kinds. However, such interface may require either the user manually sorting each message into these folders, or setting up complex rules with a variety of parameters applied to them in order to automatically filter messages into these folders. Finally, some user interfaces may attempt to help a user find the relevant messages by adding a variety of visual indicators to their message list, which can appear on messages to highlight different parameters of those messages. These may include use of color, shapes, or different positions of these indicators on a message. However, such approach can result in a highly complex user interface with a visual array of many different visual indicators that lack of intuitive indication of the importance level of the messages.

SUMMARY

Recognized herein is a need for systems and methods for visualizing digital content with improved user interface and functions to enable a focused home view of relevant content to the user. In particular, there is a need for the visualizing tool to be built in applications for managing large numbers of messages or objects.

The present disclosure provides methods and systems for visualizing digital content with enhanced features for a variety of applications. The applications may include, for example, customer relationship management (CRM) services (e.g., SALESFORCE®) or content management services for managing a wide range of different kinds of objects in digital content collections (e.g., campaigns, opportunities, leads, contacts, tickets, notes, call logs, etc.); electronic email (email) applications for managing messages; chat applications for managing messages in the form of chat message; productivity services such as those found in GOOGLE® G-SUITE or APPLE® iCLOUD, Microsoft Office365 online documents, and iCloud Pages, Docs, Sheets, Slides, for managing a large variety of different kinds of documents such as word processing documents, spreadsheets, presentations, forms, or diagrams. The data objects in such applications may have a large number of properties, parameters, or flags which apply to them, that are designed to facilitate identifying such objects when utilizing with the application. The system and method herein may allow such applications to configure the respective user interface around a dedicated "home view", wherein the basic user interface of the application presents the user with a dedicated list of objects to interact with, such as the inbox of an email client. Although the visualization methods and systems as described later herein are presented in the context of email application and email user interface, the methods and systems as described herein can be used in various applications such as those described above.

Systems and methods of the present disclosure provide improved user interfaces and features to web-based services with a small set of graphical components. This may beneficially allow users to conveniently customize or set up an inbox or home view with more intuitive and simplified operations. For example, users may alter how the content of the inbox is organized via a small set of buttons that automatically trigger variations of combinations of multiple, complex parameters of the digital content in the application. The buttons may be provided in an intuitive and efficient manner without requiring expertise of the user for performing complex search. For example, each of the buttons may relate to a specific property of a digital content item, and by turning on one or multiple of these buttons at the same time, a user may adjust the contents of the inbox to include or exclude a given combination of digital content items in that inbox at a given time. The inbox may retain a user-defined configuration permanently, until the next user customization, or the user may turn an applied configuration on and off with a single click.

The improved user interface provided by the system and method may allow users to drastically reconfigure an inbox to present an optimal presentation of content that is relevant in a user-selected period with simplified operations (e.g., one or more clicks of a small set of buttons) thereby eliminating the need to execute searches or save and load different structures of the inbox which can involve multiple steps resulting an inefficient process. Additionally, instead of requiring users to execute search queries or filter search results in order to find content, users are provided with a steady and constantly updated presentation of the messages which are relevant to them on a home screen. The inbox or home view may be an optimized and customized home view in the applications as described above. Furthermore, such improved user interface components can be easily integrated to database applications allowing users to interact with digital content collections without complex search queries, modify the selected content via the interactive user interface components, and save or bookmark searches (e.g., underlying search queries mapped to the user command received via the graphical components) so the user may conveniently retrieve the same results at a future time.

The disclosed systems and methods may enhance the inbox or home view, providing them with improved, unique functionality. Systems and methods of the present disclosure may provide an inbox or home view that appears within a scrollable or navigable collection of digital content items. The improved search and filter functions may be applied to enabling powerful sorting or filtering capabilities in applications where the user is managing and interacting with up to hundreds of new or recent digital content items on a daily basis, which results in a considerable amount of functionality in these applications being focused around the inbox or home view with the express purpose of helping the user navigate such a workload in a simplified way. Such user interface components can be easily accessed which beneficially allow the user to interact with a small number of digital content items at any given time, and provide ease of focus without an overabundance of items in the display. In some cases, the provided systems may allow a user to perform a filter or search with one click to return to the same focused inbox. Allowing for complex searches with a small set of graphical elements may be particularly advantageous on devices with limited screen real-estate such as mobile devices, a wearable computer, a tablet computing device, or other suitable computing device, where interacting with a large collection of digital content items may be particularly challenging.

In an aspect of the present disclosure, a method is provided for visualizing digital content. The method comprises: (a) injecting a user interface component and a back-end component into the web-based application; (b) rendering said web-based application with said user interface component, wherein said user interface component comprises a plurality of graphical elements and each of said plurality of graphical elements corresponds to a parameter or property of the digital content; (c) receiving an input from a user via at least one of said plurality of graphical elements to alter a state of the corresponding parameter in said backend component, wherein each of said plurality of graphical elements corresponds to multiple states of said corresponding parameter; and (d) updating a display of said digital content within said web-based application according to said state and said parameter.

In a separate yet related aspect, a non-transitory computer-readable medium comprising machine-executable instructions that, upon execution by one or more computer processors, is provided for implementing a method for visualizing digital content of a web-based application. The method comprises: (a) injecting a user interface component and a backend component into the web-based application; (b) rendering said web-based application with said user interface component, wherein said user interface component comprises a plurality of graphical elements and each of said plurality of graphical elements corresponds to a parameter or property of the digital content; (c) receiving an input from a user via at least one of said plurality of graphical elements to alter a state of the corresponding parameter in said backend component, wherein each of said plurality of graphical elements corresponds to multiple states of said corresponding parameter; and (d) updating a display of said digital content within said web-based application according to said state and said parameter.

In some embodiments, said web-based application comprises an electronic mail (email), a chat application, a content management application, an enterprise management tool, or a task management application. In some embodiments, said plurality of graphical elements include a plurality of buttons. In some embodiments, said web-based application is an email application that is displayed with said plurality of graphical elements including a plurality of buttons. In some cases, said plurality of buttons correspond to configuring the display of emails by dates, importance or tags.

In some embodiments, said input from said user is received via two or more of said buttons for displaying said digital content based on a combined states of two or more parameters corresponding to said two or more buttons. In some embodiments, said multiple states comprise inclusion, exclusion and off. In some embodiments, said input from said user for altering said state is a click on said at least one graphical element.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
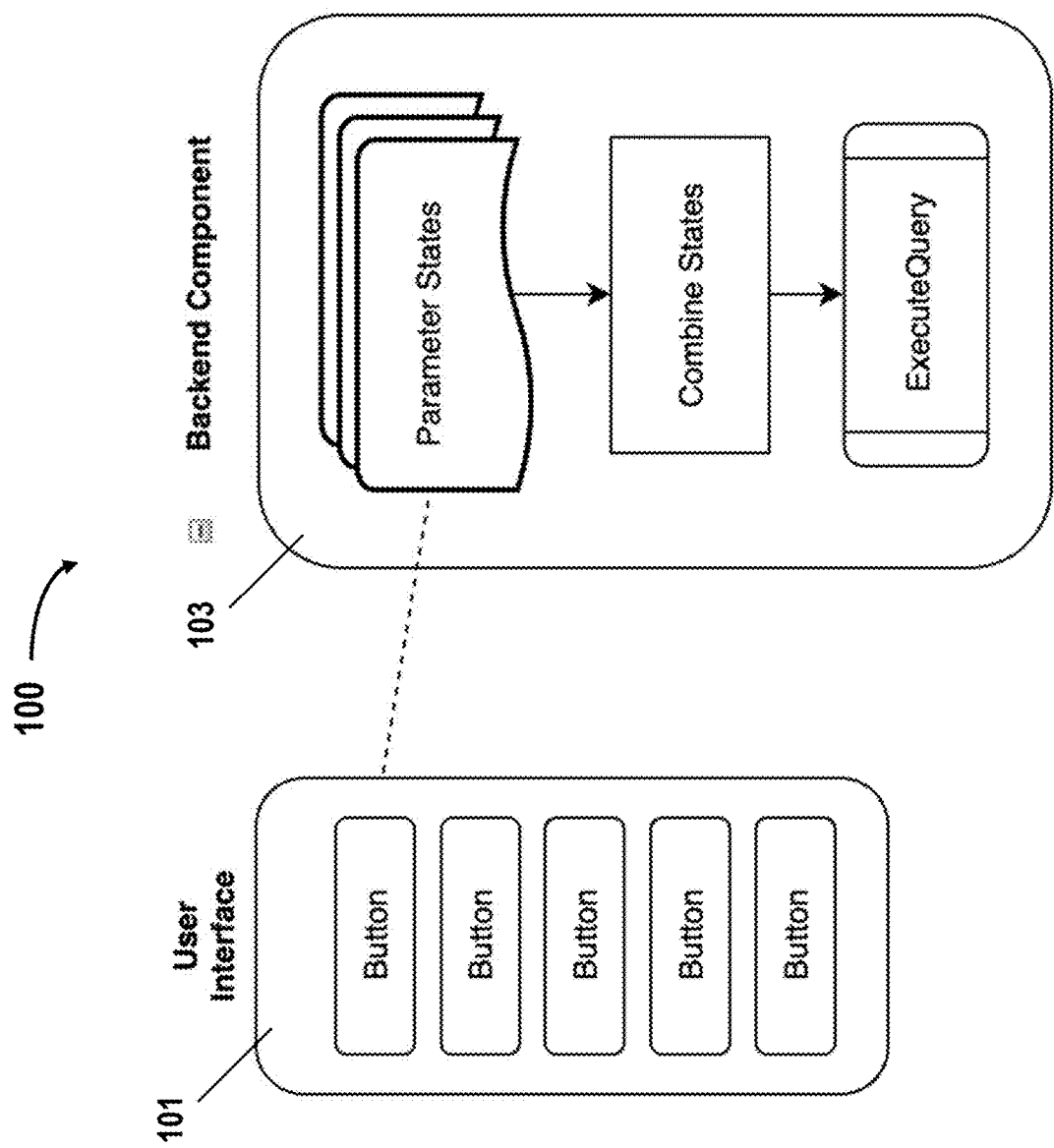
FIG. 1 schematically illustrates an example of a system, in accordance with some embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Reference throughout this specification to "some embodiments," or "an embodiment," means that a particular feature, structure, or characteristic described in connection with the embodiment is included in at least one embodiment. Thus, the appearances of the phrase "in some embodiments," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry. The electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system. In some embodiments, a user may access digital content via an improved user interface. In some cases, the user interface may be a graphical user interface (GUI) rendered through the application executed on a user device. The GUI may show graphical elements/components or one or more animatable graphical elements/components that permit a user to interact with the web-based content.

Redefining Home View Content

FIG. 1 schematically illustrates an example of a system 100. The system may comprise a user interface (UI) component 101, and a backend component 103 that provides interaction with a queryable database. The system may include an existing query driver or may not have a specific query driver.

The UI component 101 may comprise one or more interactive graphical elements such as "buttons." It should be noted that the buttons are for illustrative purpose only as one of ordinary skill would recognize that other user interface elements (e.g., check boxes) may be used so as to implement the functionality offered by embodiments of the present disclosure. The buttons may each correspond to an action that may set or unset a particular parameter or pre-defined set of parameters, contributing to an aggregate of parameters that may be used to perform a query through an available query driver. The pre-defined set of parameters may include, for example, folder (e.g., inbox, sent, draft), tags (e.g., starred, snoozed), importance level (e.g., important), date and various other parameters based on the web application. A given button on the UI may correspond to a current state from the backend component of a given parameter in use. The parameter states may include, for example, inclusion (e.g., include items with the parameter in the query), exclusion (e.g., exclude items with the parameter) or off (e.g., not include the parameter in the query). The button may be configured to receive user actions (e.g., click) allowing the user to toggle the corresponding parameter on or off thereby updating the aggregate list of parameters and results. For example, upon receiving a user input (e.g., click once) via a selected button, the corresponding parameters states may be selected and aggregated by the backend component into combined parameters based on the combined states for create a query. Next a query may be automatically executed based on the combined parameters and the corresponding combined states.

The backend component 103 may connect to a pre-existing database, application program interface ("API"), or other query driver that receives parameters, combines the parameters to generate a query, and supplies one or more results responsive to the query. In addition to executing the queries by the query driver, the backend component may be responsible for storing the states of supported parameters and reporting its state information to the UI component upon a request.

Figure 2:
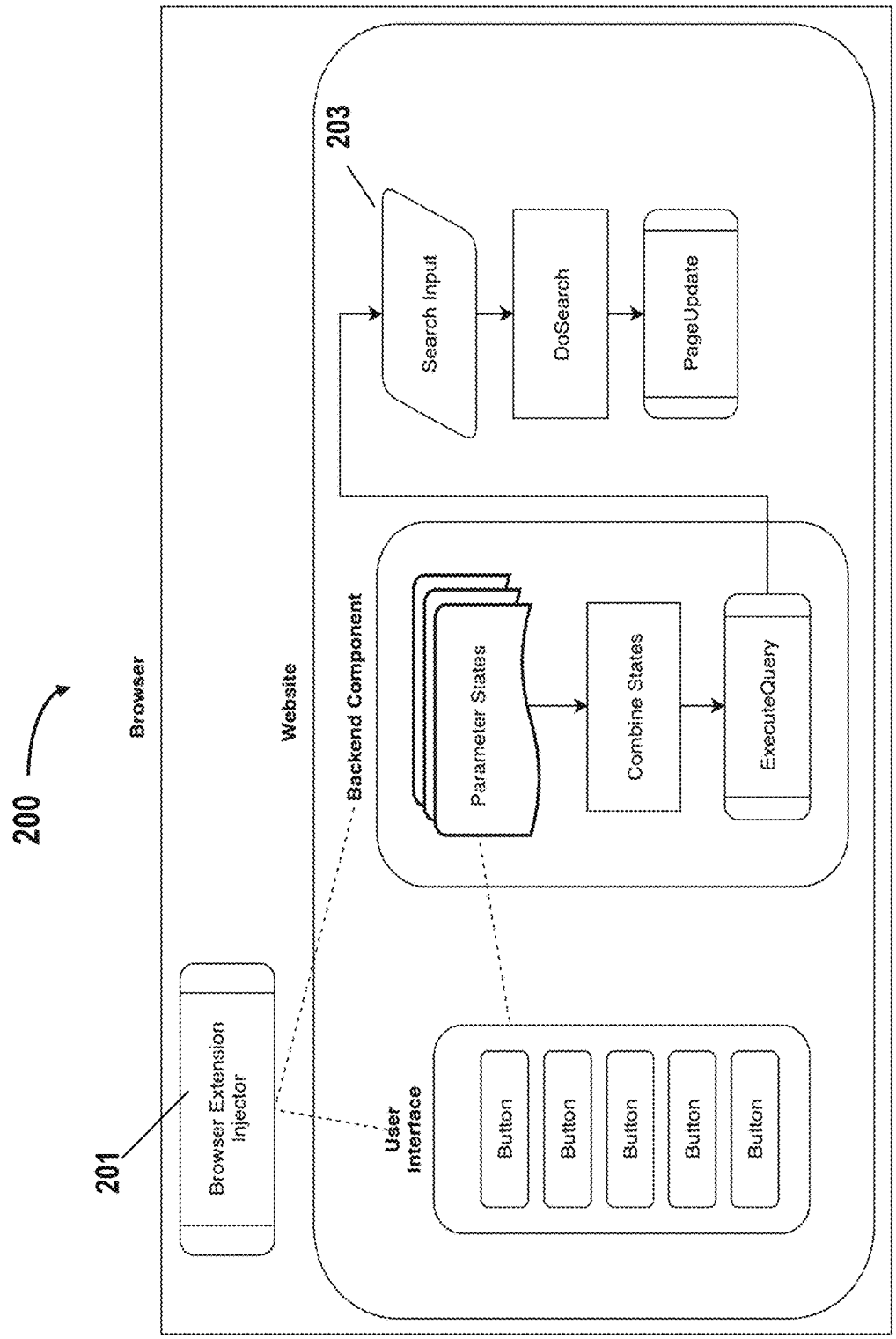
FIG. 2 shows an example of a system implemented in a third-party webpage.

FIG. 2 shows an example of the system implemented in a third-party webpage 200. In the illustrated example, the system may be implemented via a browser extension injector 201 and an existing queryable search input. The web-based services or digital content may be accessible via particular URLs. The browser extension injector 201 may be configured to inject JavaScript into a web-based document or webpage. For example, the UI component and backend component may be injected into webpages rendered by a client-side browser when those webpages contain a pre-defined queryable element. This may allow the system to be automatically configured for the specific instance. In some illustrated example, executing a query in response to receiving a user input via a selected button may include a process 203 of searching input, performing the search and updating the webpage.

Figure 3:
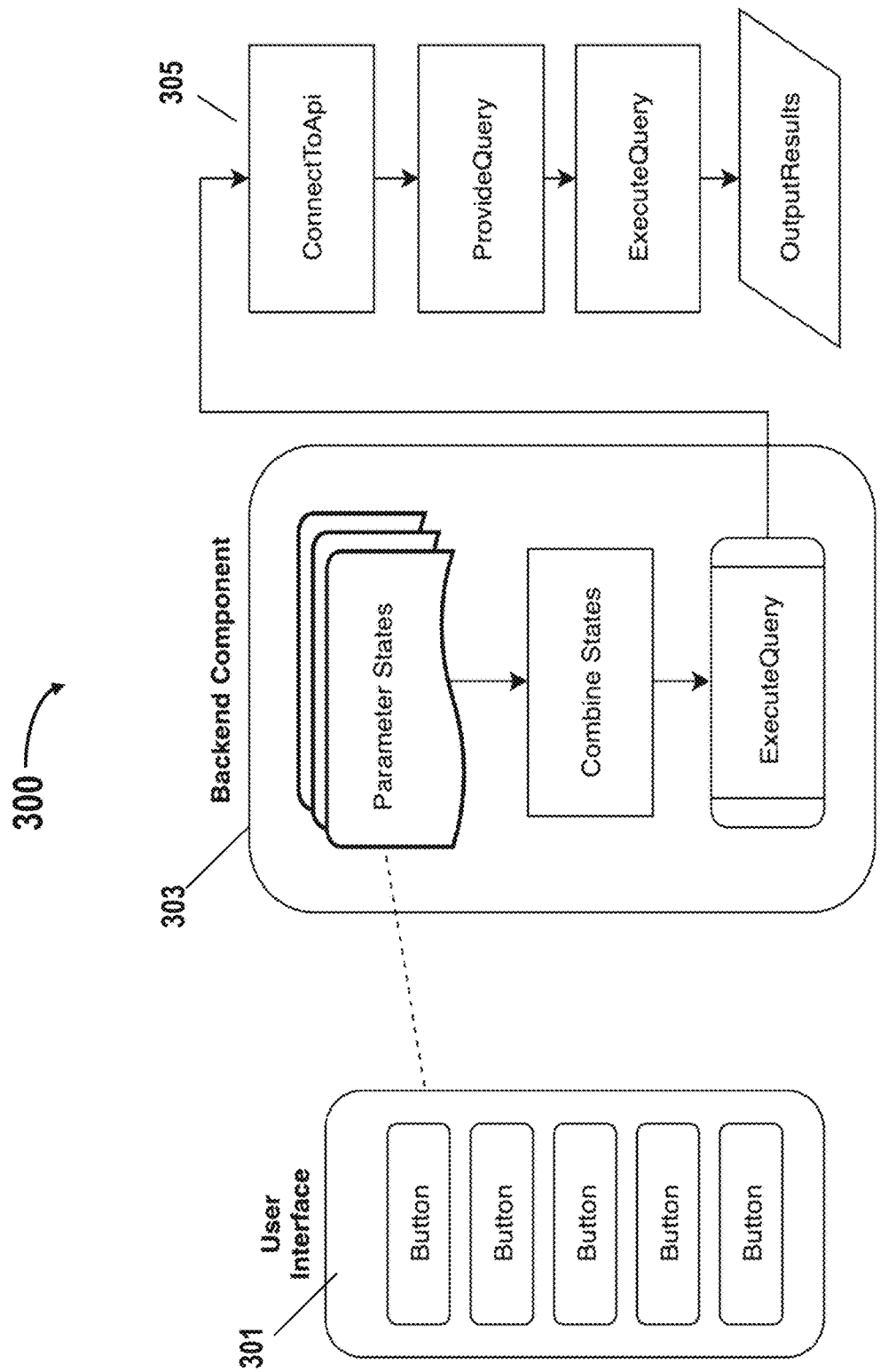
FIG. 3 shows an example of a system implemented in a standalone or discrete application, with direct database access for a query driver.

FIG. 3 shows an example of the system implemented in a standalone or discrete application, with direct database access for a query driver. As illustrated in FIG. 3, when the system is implemented in a service that provides direct access to a database or API, the UI component 301 and backend component 303 may be built in to a standalone application. The backend component 303 may connect with the database or API to perform queries based on the parameter states triggered by the UI component. The parameter states may include, for example, inclusion (e.g., include items with the parameter in the query), exclusion (e.g., exclude items with the parameter) or off (e.g., not include the parameter in the query). The query process 305 may include, for example, connecting to an API, generating query based on the combined parameter states, executing the query and outputting the search results.

In some embodiments, the user interface features and backend components may be directly integrated to an existing web-based application. In alternative embodiments, methods and systems of the present disclosure may be implemented in an application and an operating system. The operating system can be any type of operating system (e.g., Windows, Linux, Mac OS, iOS, Chrome OS, etc.) on a user device that is used by a user to interact with web-based content. The application may include user interface features (e.g., buttons, focus filter components) for allowing interaction with those webpage-based documents in a manner of a desktop-based application. In some cases, the operating system may include a URL handler, a filetype handler, and a notifications application program interface ("API"). In some cases, the operating system may only include a URL handler or may only include a filetype handler. The methods and architectures of interacting with web-based content via a desktop-based application and its various components are described in US 20190155881 entitled "desktop enabling of web documents" which is incorporated by reference herein in the entirety.

Examples of User Interface

As described above, the systems and methods may provide an enhanced graphical user interface or interface components for visualizing digital content, allowing for people to perform complex advanced search functions without knowing any syntax, and modifying that search in an exponential number of ways without having to alter complex text strings. The provided methods and systems may also allow users to easily mix and match a number of complex parameters together, perform these complex, parameter-driven searches quickly in an interactive interface in an intuitive manner.

Figure 4:
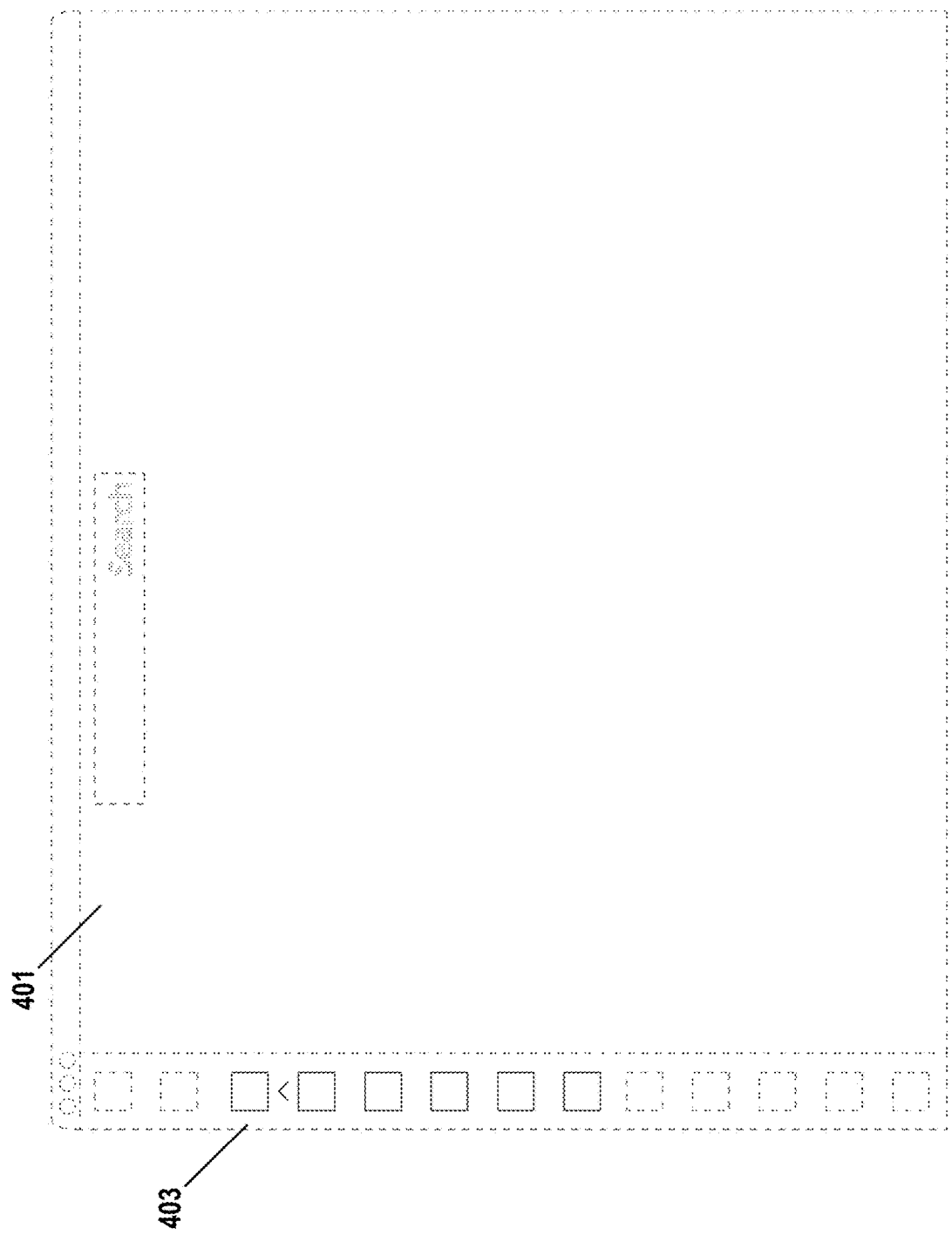
FIG. 4 shows a schematic representation of a system with buttons alongside a home view.

FIGS. 4-14 show various examples of the user interface elements. FIG. 4 shows a schematic representation of a system with buttons 403 alongside a home view 401. The buttons can be the same as those described herein. As shown in FIG. 4, a system for redefining home view content may include a computing device with a display and an application including a message client, an inbox view, and an inbox control component of several buttons.

As described above, each of the multiple buttons may relate to a parameter or property of a digital content item. A user may be permitted to click on one or more buttons to quickly alter the definition of the inbox and the content it shows.

In some cases, a button may correspond to multiple states of the respective parameter(s). The multiple states may be triggered by simple user actions received via the button. For example, a first click on the button may alter the inbox to include all items of a given property, a second click on the button may alter the inbox to exclude all items of that same property, and a third click may turn the button "off" (e.g., the inbox may not include or exclude any items with that property).

In some cases, the mechanism by which the buttons may define the contents of the inbox may involve the native search functionality of the application itself. In such cases, the button selections provided by a user may automatically populate a search string in the search field of the application. The search string may serve as the definition of the persistent inbox. A benefit of such capability is that many of these applications may have powerful and complex search functionality in which a user is permitted to define a large number of highly specific parameters to find messages in the form of search results or further filter these results, however, such operations may require a high level of expertise for the user. The systems and method herein may allow users to create an exponential number of complex searches with simplified user interactions (e.g., a few clicks), without requiring the user to type a query, and possess knowledge of extensive search syntax and search parameters.

Figure 5:
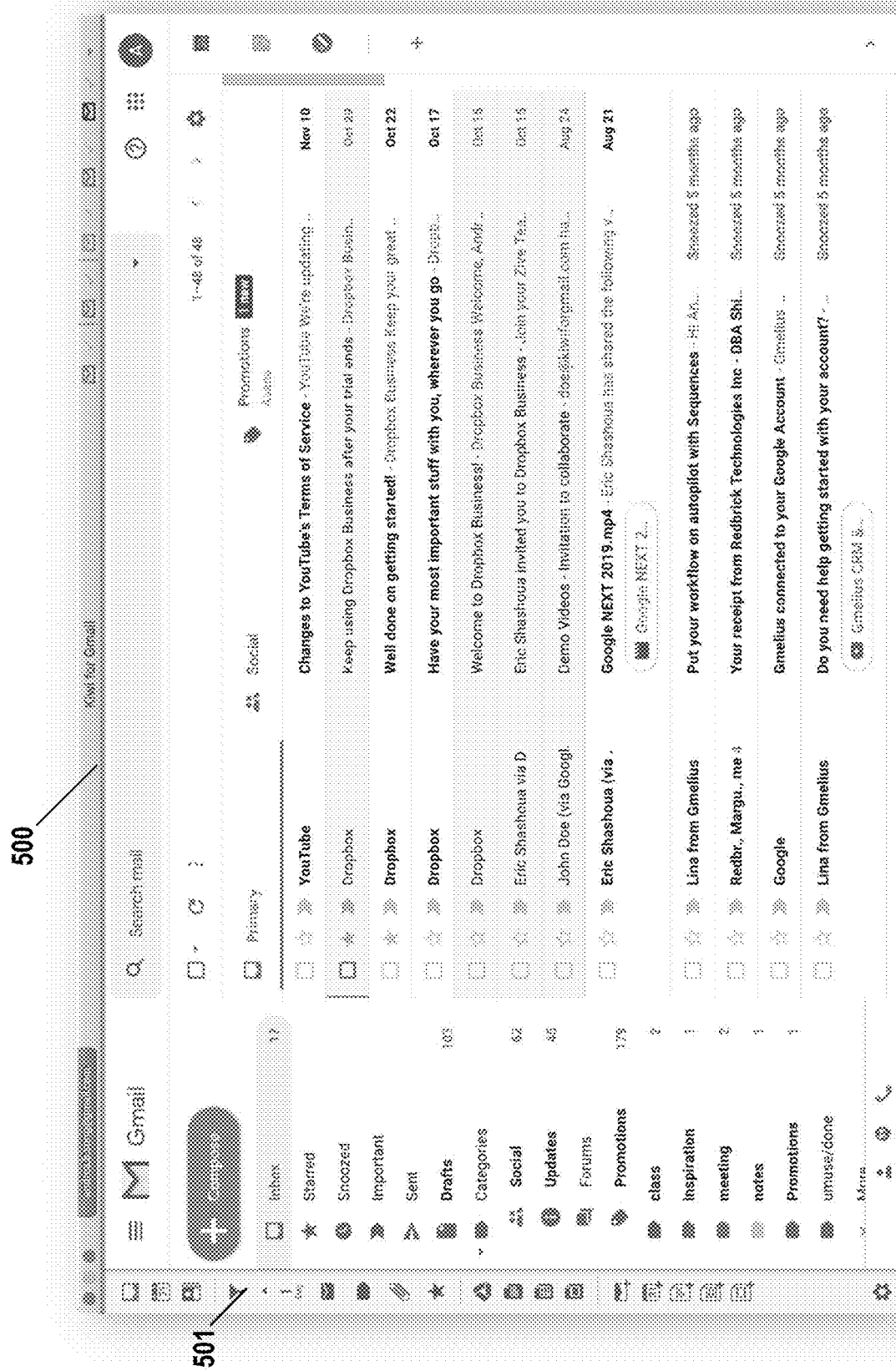
FIG. 5 shows an example of a system applied to an inbox.

FIG. 5 shows an example of the system applied to an inbox 500. The buttons 501 may be provided in the panel as a graphical icon (e.g., funnel icon).

Figure 6:
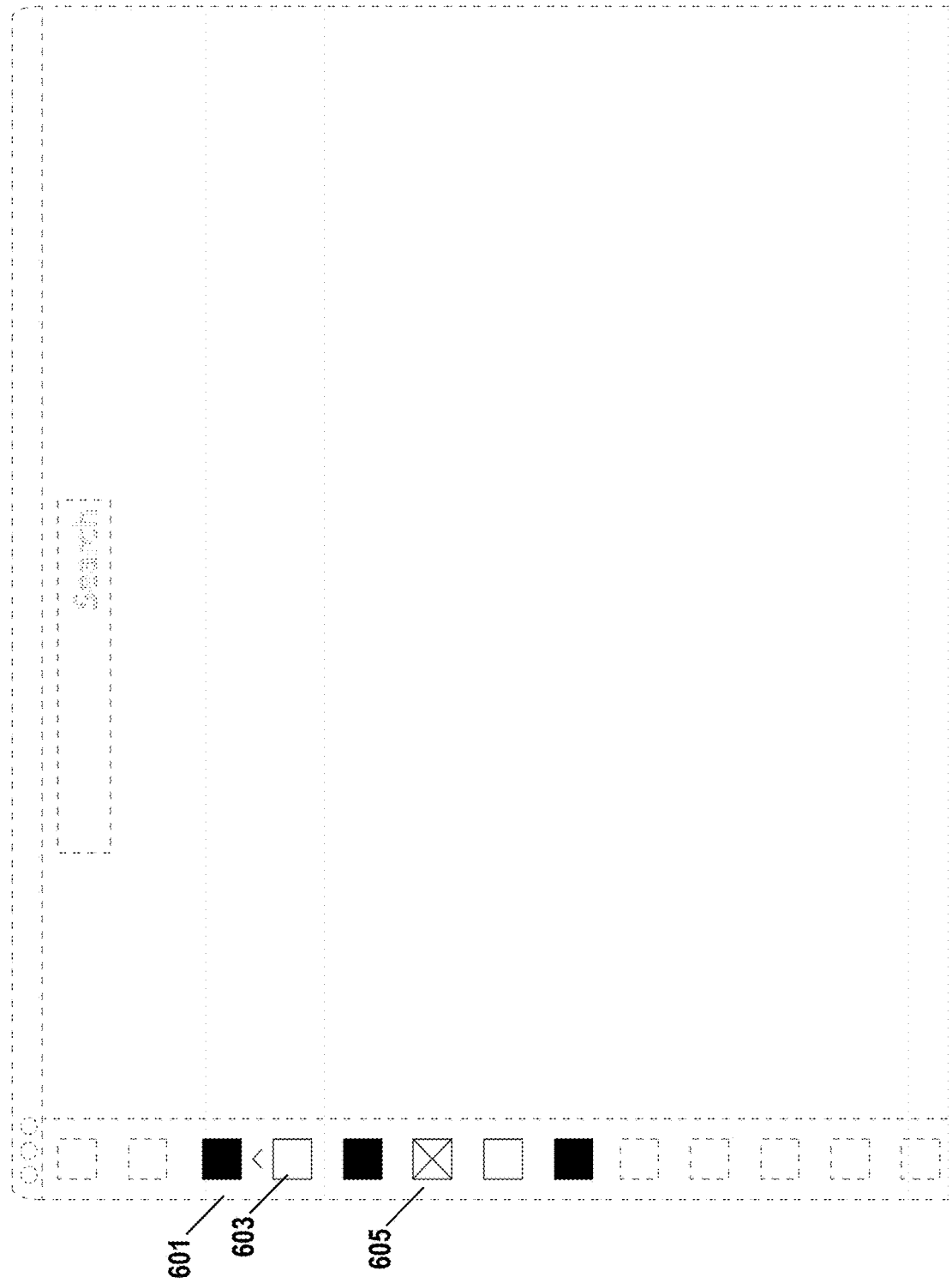
FIG. 6 shows a schematic representation of the system with buttons selectively applied in one of three states.

FIG. 6 shows a schematic representation of the system with buttons selectively applied in one of three states. As described above a button may correspond to multiple states of the respective parameter(s). The multiple states may be triggered by simple user actions received via the button (e.g., click). For example, a first click on the button may set the corresponding parameter to a first state 601 such as altering the inbox to include all items of a given property. A second click on a button may set the corresponding parameter to a second state 603 such as altering the inbox to exclude all items of that same property. A third click on a button may turn the button "off" or set the parameter in an off state 605 such as the inbox may not include or exclude any items with that property).

Figure 7:
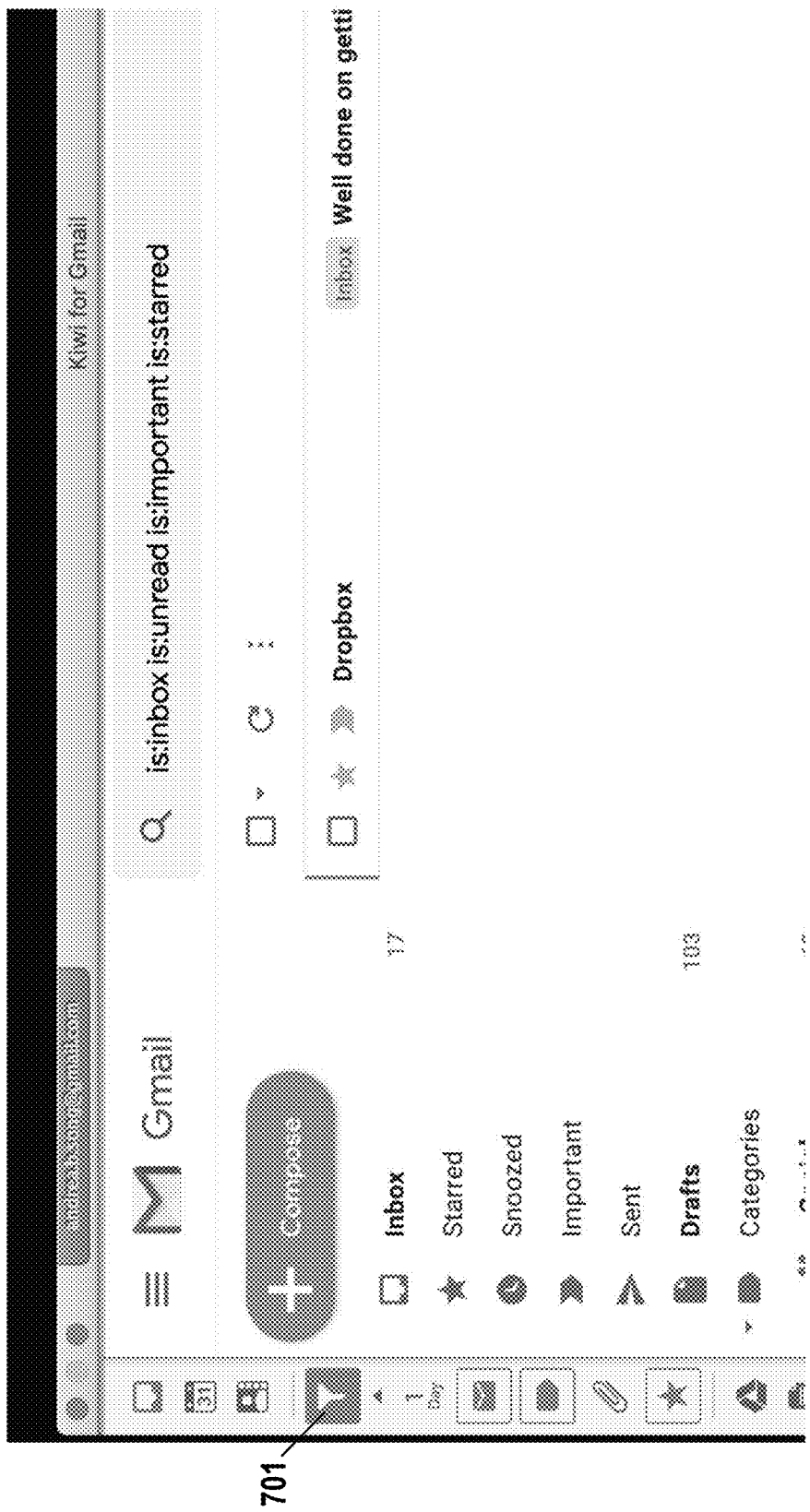
FIG. 7 shows an example of a system with certain focused parameters applied to a Gmail module.

FIG. 7 shows an example of a system with certain focused parameters (e.g., inbox, unread, important, starred) applied to a Gmail module. In the email view, the filtering feature 701 may be provided in the panel as a graphical icon (e.g., funnel icon).

Figure 8:
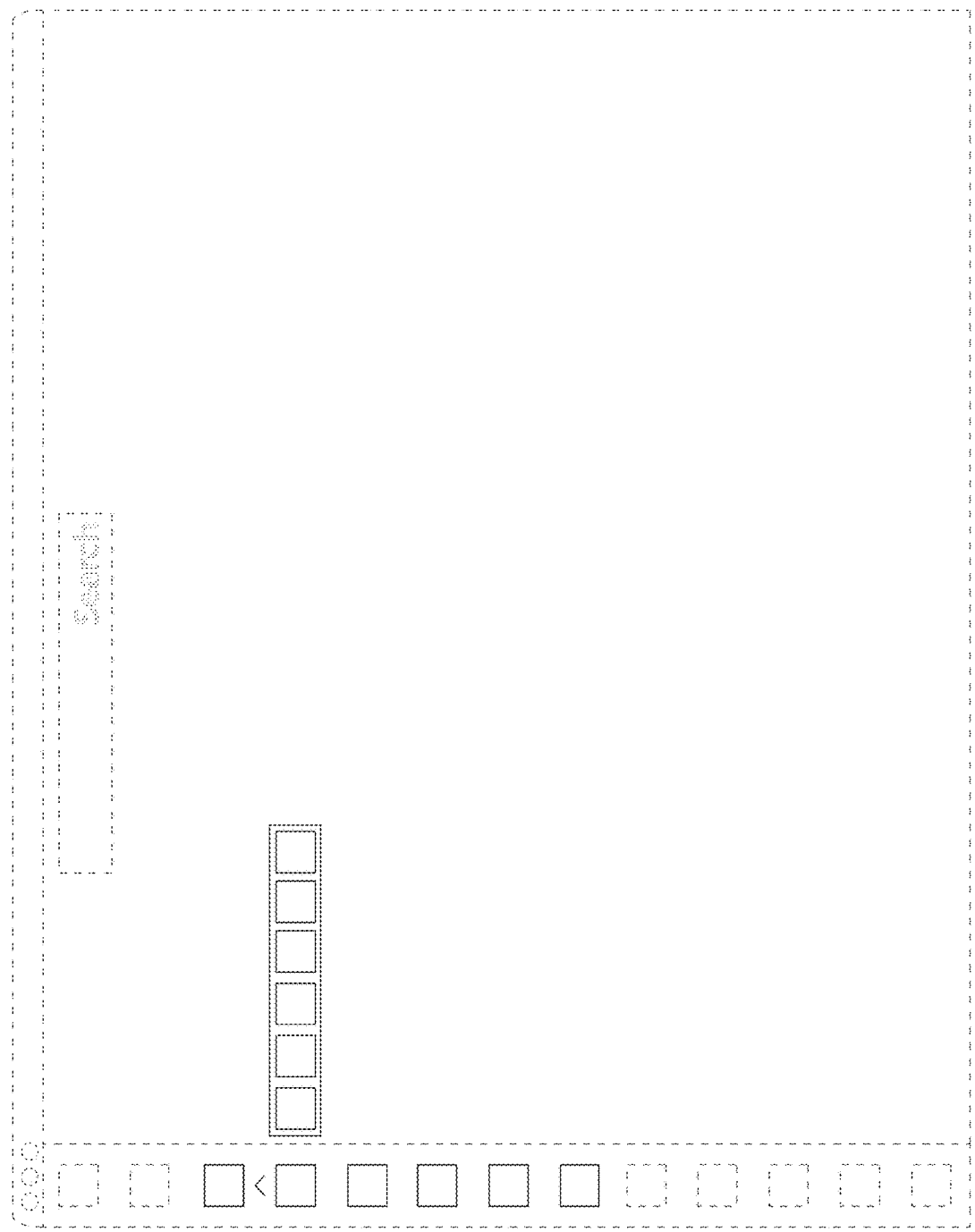
FIG. 8 shows a schematic representation of a system with sub-selections to define additional parameters within a complex parameter such as date.

A plurality of filtering options can be nested under the filtering feature. For example, a user may select filtering operations from filter by day, recent emails, importance of email, attachment and the like. FIG. 8 shows a schematic representation of a system with sub-selections to define additional parameters within a complex parameter such as date.

Figure 9:
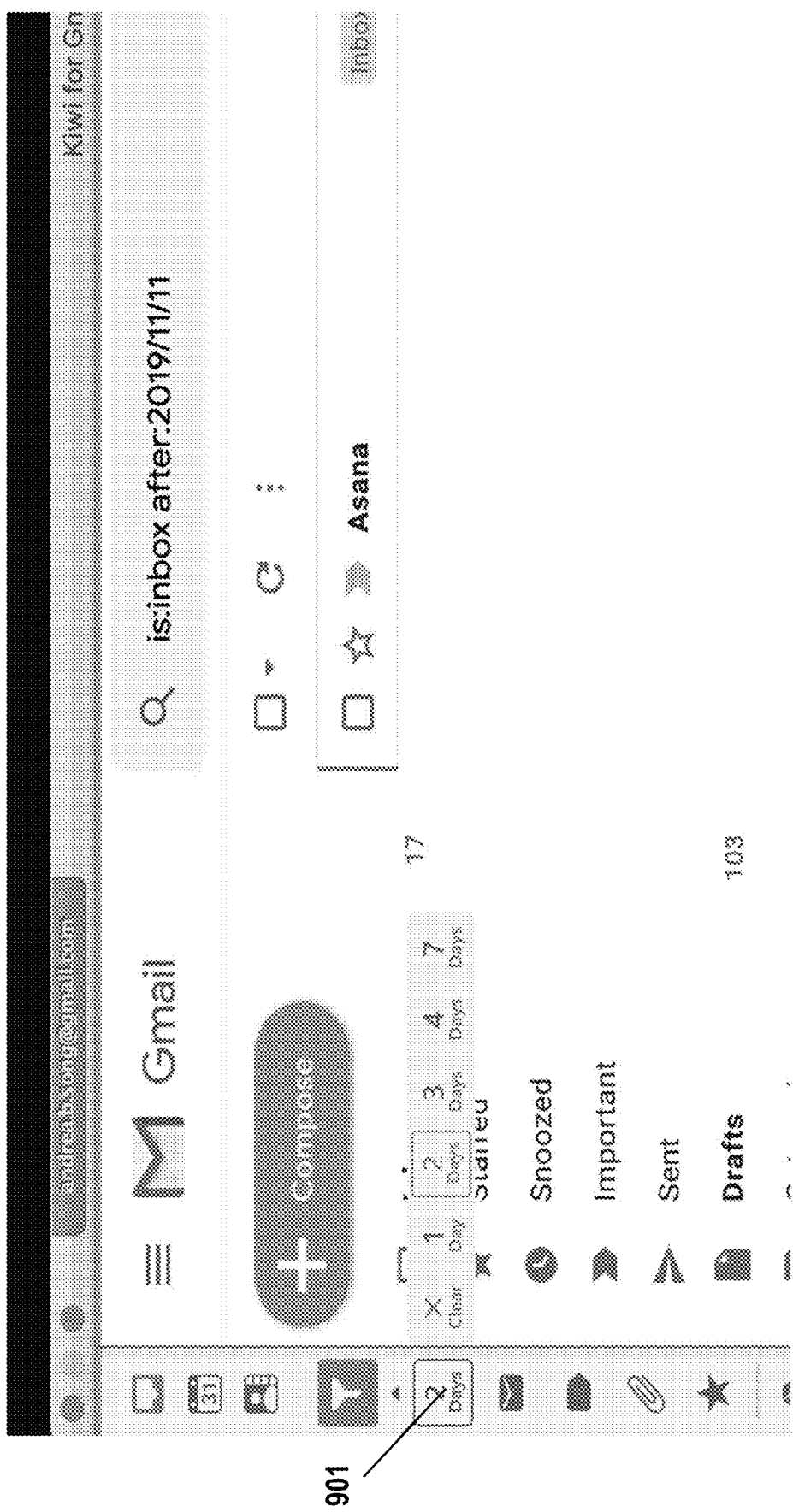
FIG. 9 shows an example of a system with sub-selections.

FIG. 9 shows an example of a system with sub-selections. In the example of filtering by recent days, upon clicking on the Day icon 901, a menu including a set of recent days options or sub-selections are displayed. A user may then filter the emails by the recent one day, two days, three days and the like.

Figure 10:
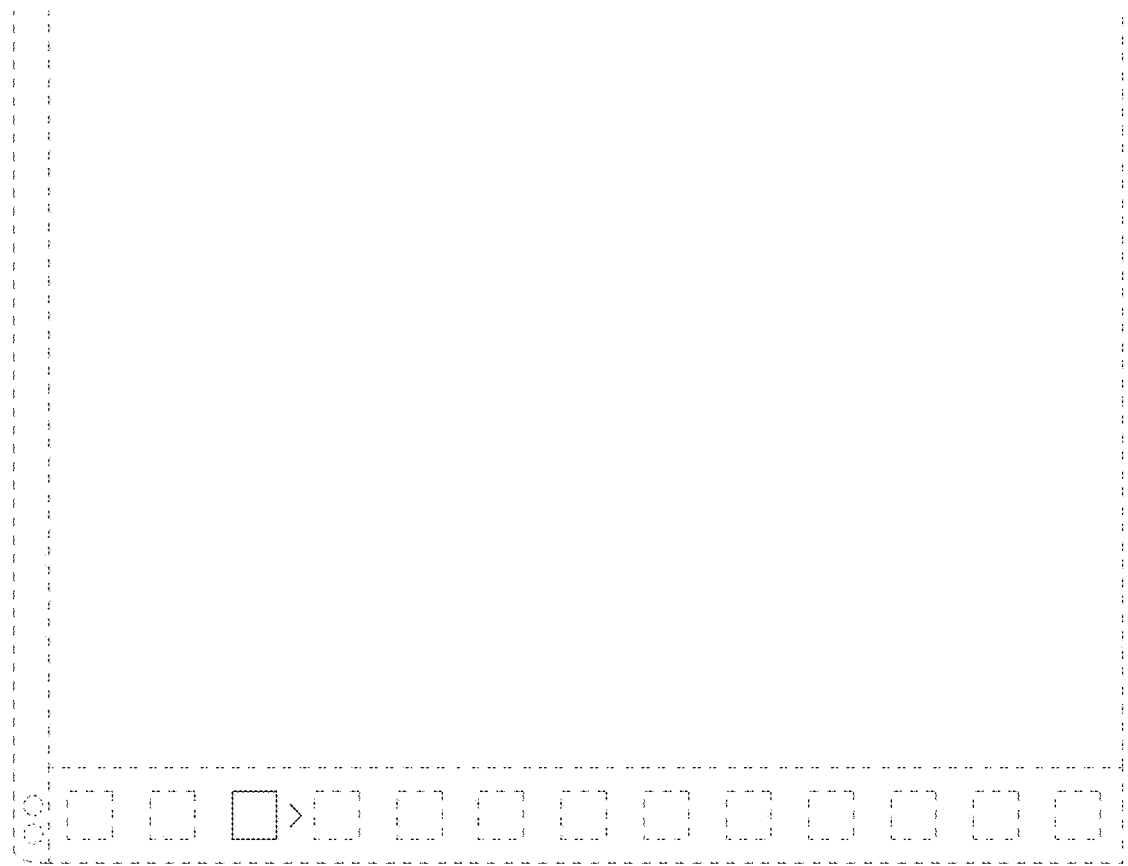
FIG. 10 shows a schematic representation of a system with the buttons collapsed and hidden except for a master control button displayed.
Figure 11:
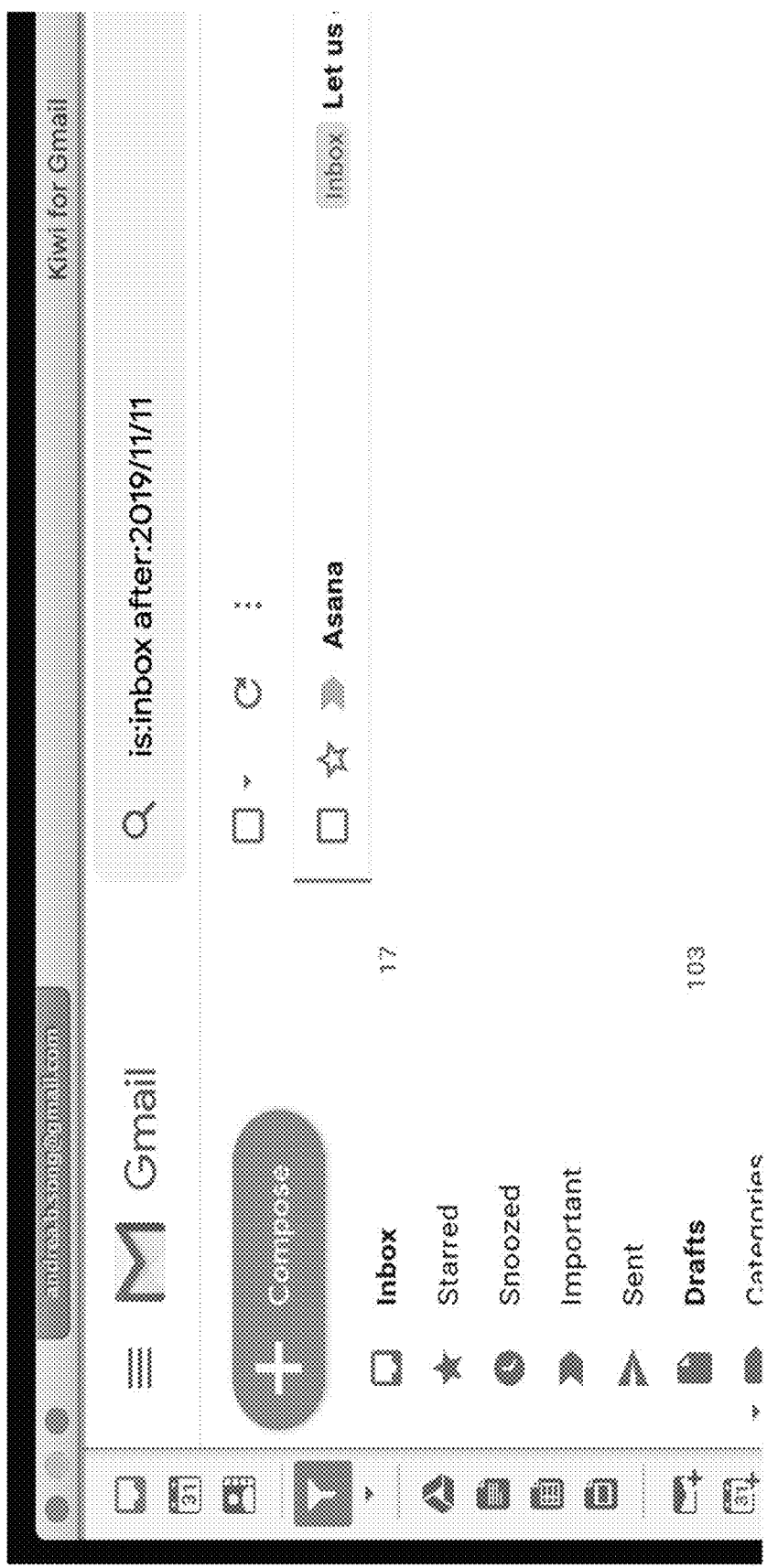
FIG. 11 shows an example of a system with buttons collapsed and hidden except for the master control button (e.g., funnel icon) displayed.

In some cases, the system may include a button to hide or show all of the remaining buttons at once, allowing for a streamlined interface showing only the global, main button (master button). FIG. 10 shows a schematic representation of a system with the buttons collapsed and hidden except for a master control button displayed. FIG. 11 shows an example of a system with buttons collapsed and hidden except for the master control button (e.g., funnel icon) displayed.

Figure 12A:
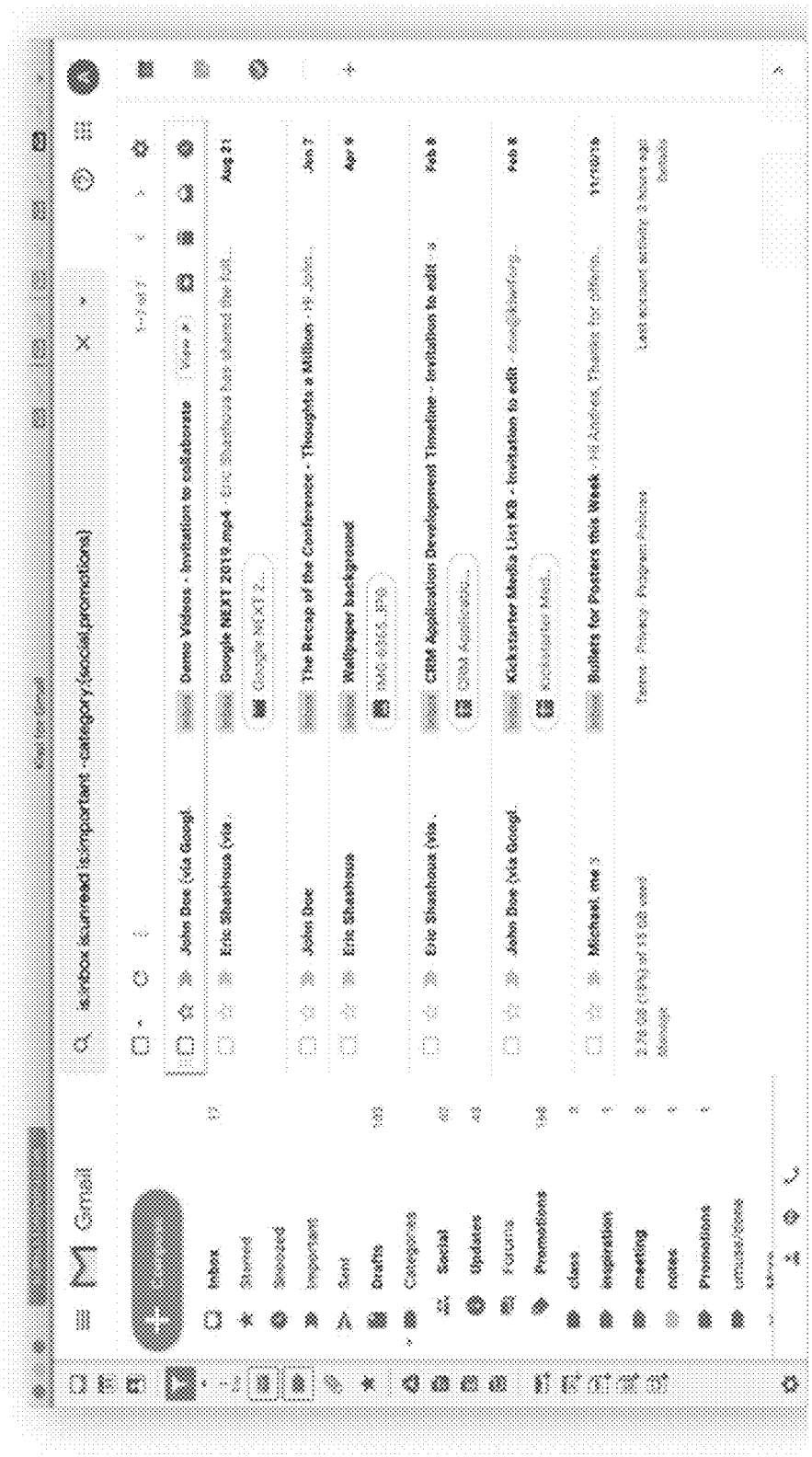
FIGS. 12A-C shows an example of using a focused inbox.
Figure 12B:
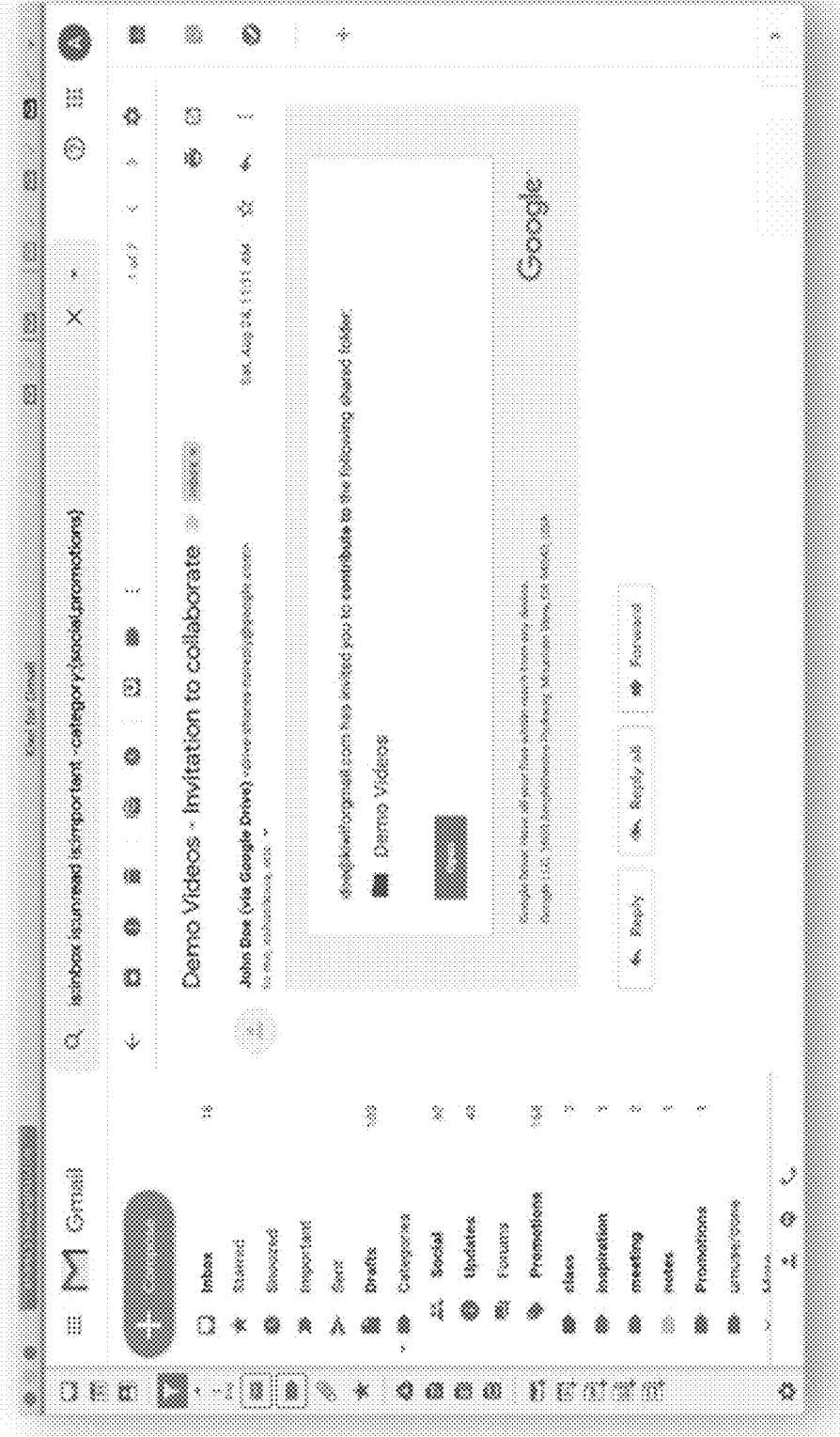
Figure 12C:
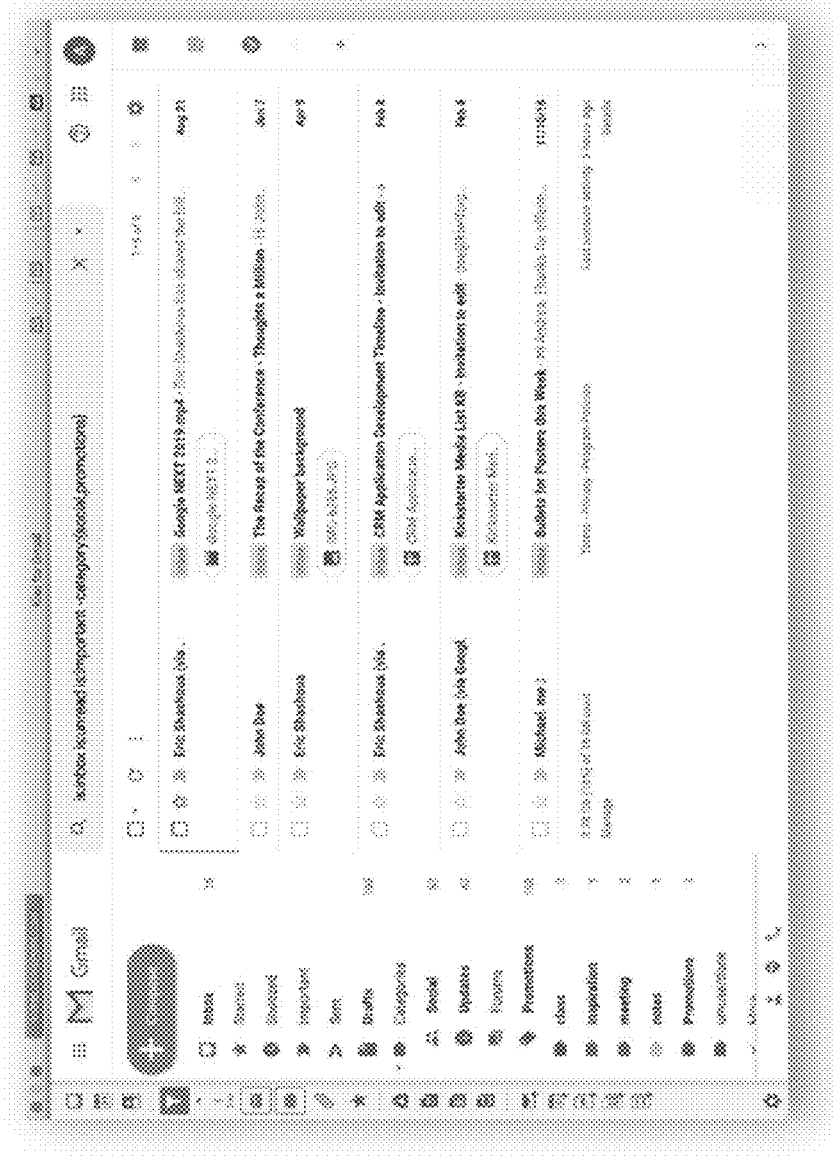

FIGS. 12A-C shows an example of using the focused inbox. The inbox parameters or configuration can be defined by the user in any stages. For example, a user may access the buttons and input user command in the home view or when navigate to an object (not within the home view). The user may open a digital content item and select filter parameters, when return to the inbox, the displayed content may be automatically updated matching the inbox definition. As shown in the example, the system may have a central or "home" location showing a body of objects or messages, such as an inbox in an email application, the user may navigate away from this inbox and return to it, and the same inbox configuration may remain applied. This beneficially permit a complex search non-ephemeral. Without such functionality, a user may have to type a crafted search phrase into the search bar, then click on one of the messages, and when they click to go back to the inbox, that search will be gone.

Figure 13:
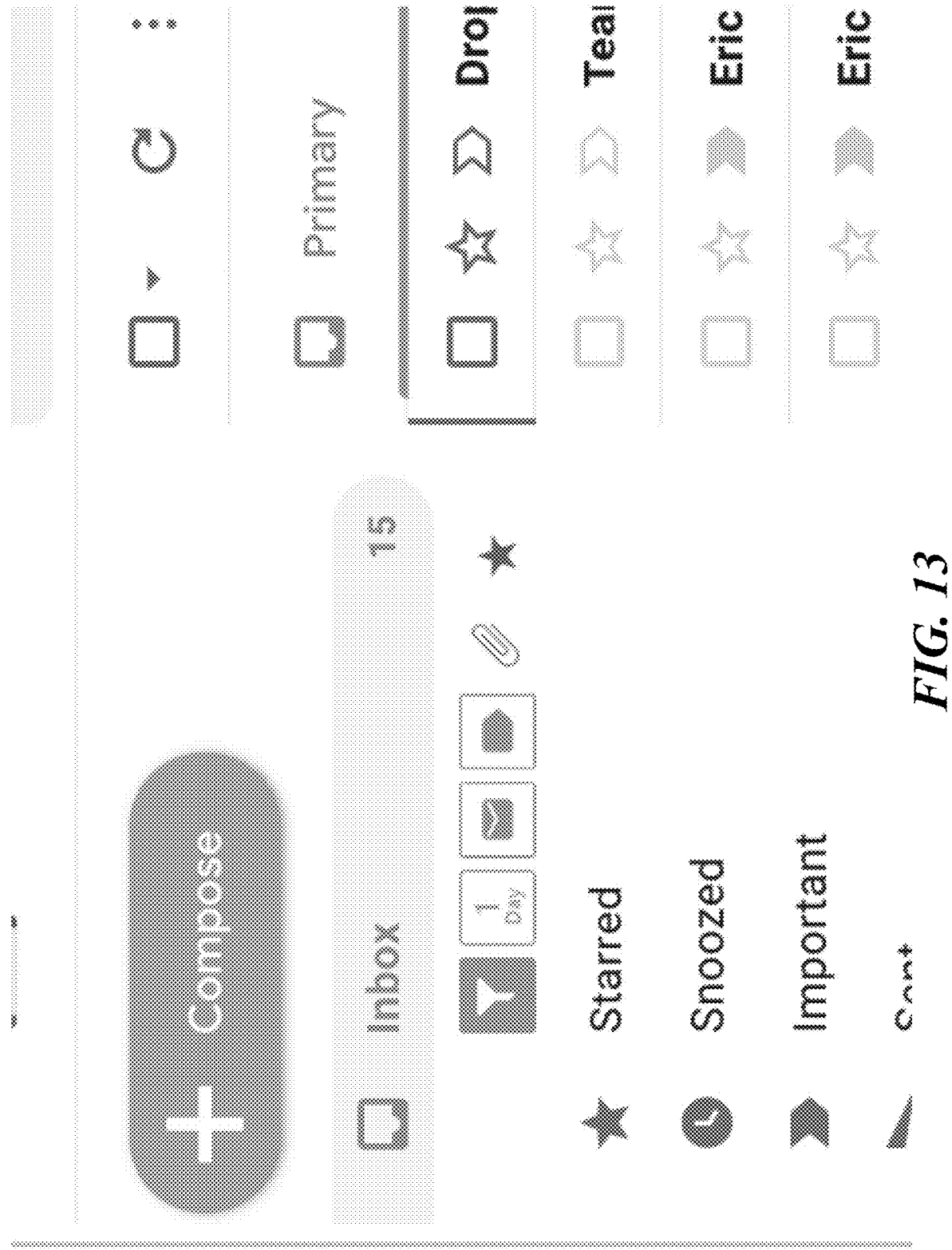
FIG. 13 shows an example that buttons are not within a sidebar/panel.

FIG. 13 shows an example in which the buttons are not within a sidebar/panel. The buttons can be displayed in any suitable location of the interface (within a left sidebar, right sidebar, outside of a sidebar, or locate next to other components within the user interface). As shown in FIG. 13, the Focus Filters buttons are displayed under the "Inbox." Other suitable display of the buttons may include, for example, a drop-down or expandable button to the right of Inbox, such when a user clicks on the component, a space may expand and more buttons may appear.

In some cases, the user may have defined various inbox types already in the application's native interface, such as excluding various types of messages from the main "primary" view, or showing starred or AI-determined "important" messages first. In this case, the user interface may adaptively integrate the "base" inbox configuration the user may have applied, and only show digital content that excludes the content already excluded in the user's base inbox view. In such a way the method can dynamically work with multiple types of "base" inboxes to show results that are relevant to the user while remaining the defined base-level organization of the inbox.

Figure 14:
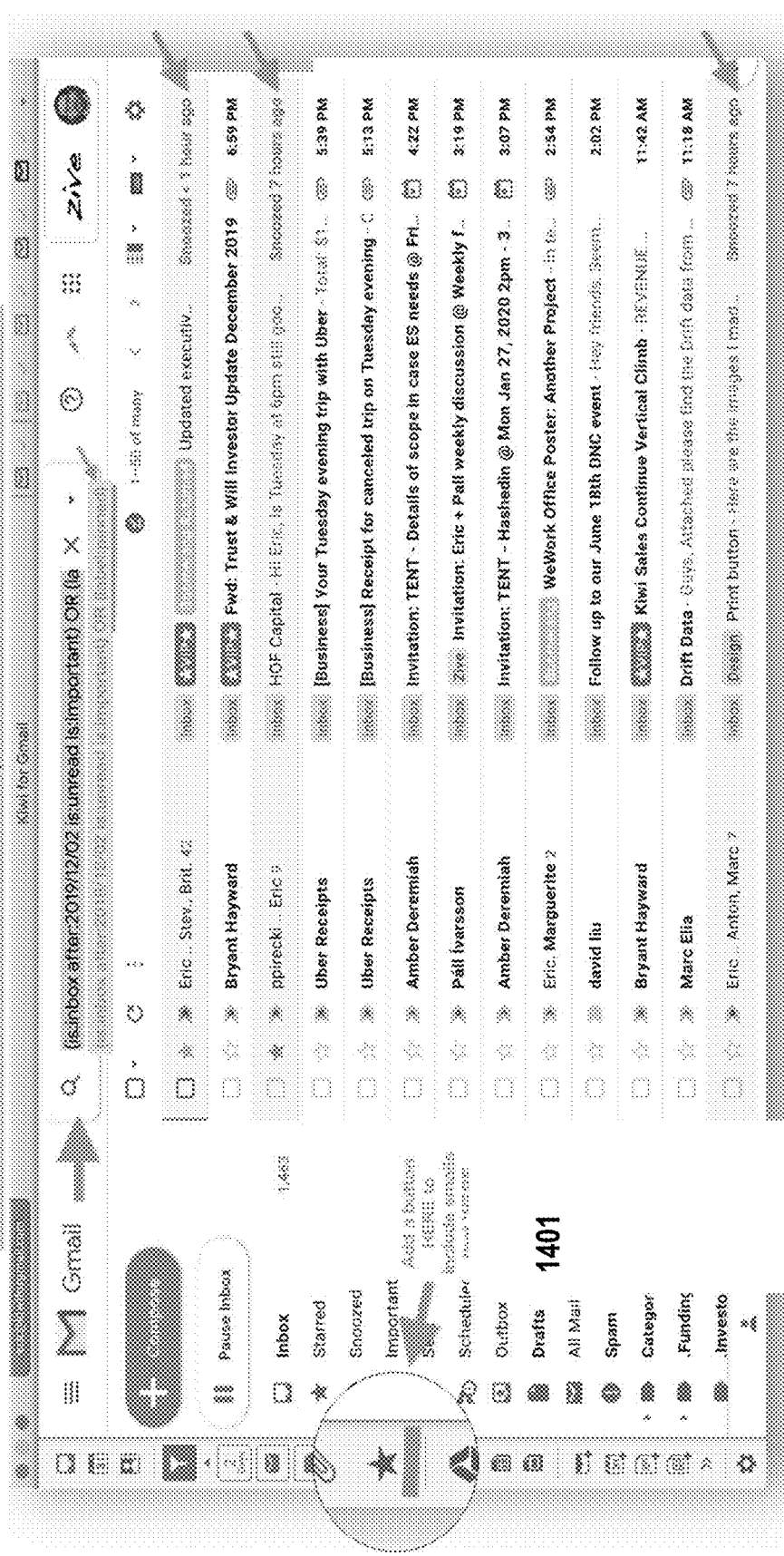
FIG. 14 shows an example of a button for filtering messages that were snoozed and returned.

In some cases, the provided methods and systems may also be compatible with snoozed or returned messages. FIG. 14 shows an example of a button for filtering messages that were snoozed and returned. The backend component may include a spill-over box for enabling the search of the snoozed or returned messages.

In some embodiments, the system may allow users to create buttons by defining their own search. Users may create or customize Focus Filter buttons that can then be mixed and matched with other Focus Filters. For example, users may create focus filter buttons corresponding to a search of recent, unread, important emails from investors. The button may correspond to a search as below:is:inbox after:2019/08/22 is:unread is:important label:investor-category: {social, promotions, updates, forums. A user may be permitted to combine two or more parameters or buttons. The system may permit users to add the parameters to a given search corresponding to the buttons on the Focus Filters bar. The search or the button may be mixed and matched with other buttons. For example, the created search string after:2019/08/22 label:investor-category: {social, promotions, updates, forums} may be saved to a new button, and the user may assign an icon and a name to the button. The user may then add additional parameters "is:unread" or "is:important" to the search string by clicking on the corresponding buttons. In some cases, certain parameters such as "is:inbox" may be created by the system as default parameters or buttons.

In some cases, a user may be permitted to create a single button for a complex search string. Upon a user clicking this button, the search string is automatically populated. In some cases, a user may create combo buttons. A click on a combo button may activate a set of buttons in Focus Filters. For example, a user may click a combo button, which may turn on the "unread" and "important" buttons and the search terms that are not already part of the focus filters buttons (e.g., after: 2019/08/22 label:investor-category: {social, promotions, updates, forums}).

A user may save any number of complex search filters and may customize the corresponding buttons in a search pane (sub-selections launched from a sidebar). Users may pin individual buttons to a sidebar or hide the buttons as needed. In a search pane, users may archive filters for future use. The search pane may automatically hide filters or buttons that haven't been used in a predetermined length of time. In some cases, when a user creates a large number of search filters (buttons), a simple search box may be provided at the top of the search pane where users can search through for old searches they may have created (e.g., searching in the pane for "investor" may automatically display any saved search with "investor" anywhere in the search string). In some cases, if a user has created these complex searches and saved them to the search pane, when the user begins typing into the email application's main search bar, it may suggest relevant saved searches as search strings. A user may modify the searches that have been saved in the search pane by clicking on the respective buttons. A user may create a search in the email application's main search box and then save the search as a filter by clicking on a "save as filter" button.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Computer Systems

Figure 15:
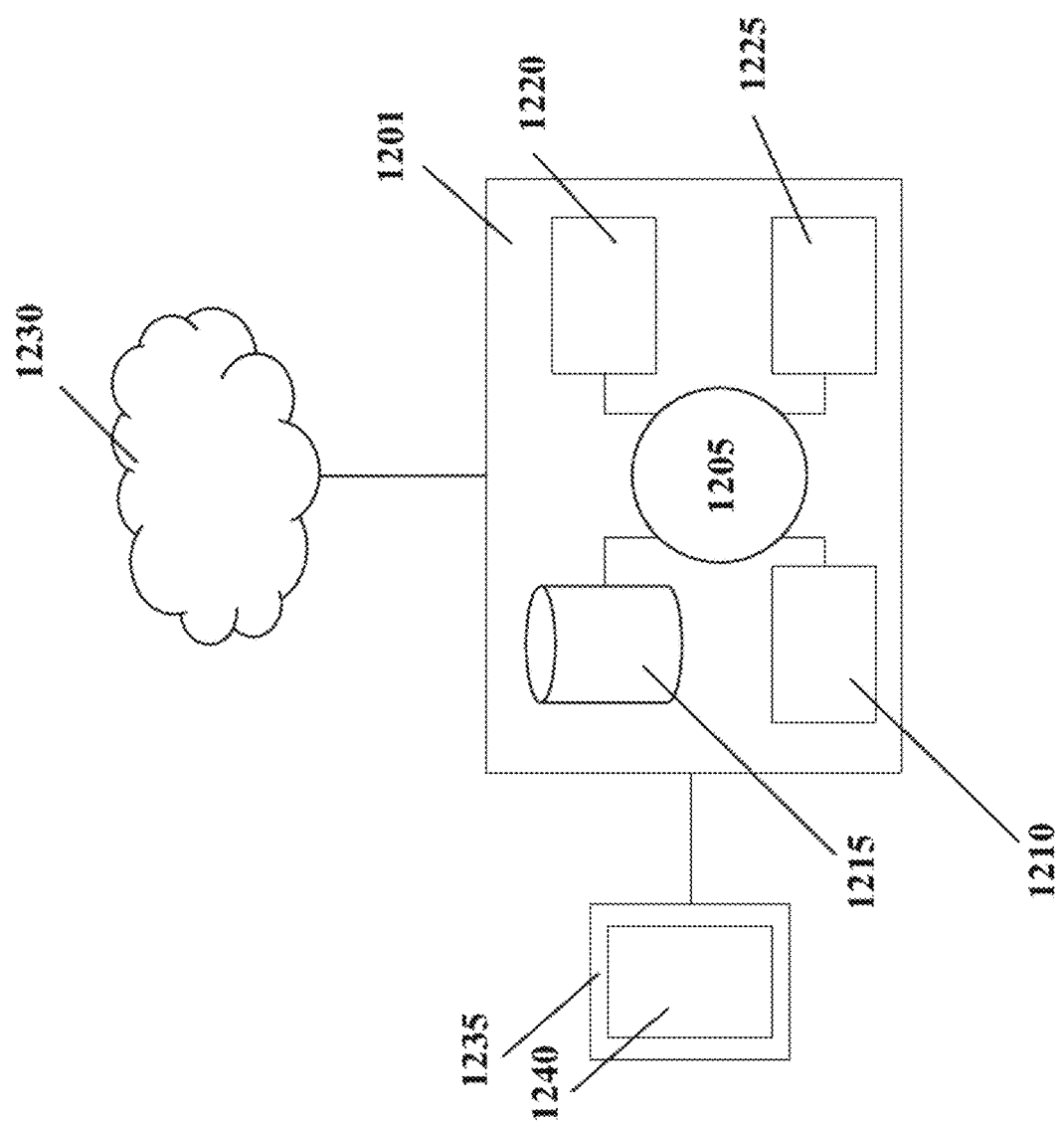
FIG. 15 shows a computer system that is programmed or otherwise configured to provide a desktop application that enhances one or more web-based services.

The present disclosure provides computer systems that are programmed to implement methods of the disclosure. FIG. 15 shows a computer system 1201 that is programmed or otherwise configured to provide a desktop application that enhances one or more web-based services. The computer system 1201 can regulate various aspects of providing the application of the present disclosure, such as, for example, retrieving the web-based service and presenting the web-based service. The computer system 1201 can be an electronic device of a user or a computer system that is remotely located with respect to the electronic device. The electronic device can be a mobile electronic device.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

The computer system 1201 can communicate with one or more remote computer systems through the network 1230. For instance, the computer system 1201 can communicate with a remote computer system of a user (e.g., a desktop user). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1201 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine-readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, a desktop application providing a web-based service. Examples of UF s include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, determine a type of web-based service.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for configuring a view of a web-based application for visualizing digital content, comprising:
    (a) injecting, via an injector, a script executable by a browser to integrate a user interface component and a backend component into an existing web-based application, wherein said user interface component comprises one or more user interface (UI) features that are not in said existing web-based application;
    (b) executing said injected script to render said one or more UI features of said user interface component within said existing web-based application, wherein said one or more UI features comprise a plurality of graphical elements and wherein each of said plurality of graphical elements corresponds to a parameter of the digital content and is configured to receive a user input to select a state from multiple states of a corresponding parameter;
    (c) using said plurality of graphical elements to define a configuration for a first view of said web-based application by:
        i) receiving a first input via a first graphical element from said plurality of graphical elements within said first view to alter a state of a first parameter in said backend component,
        ii) receiving a second input via a second graphical element within said first view to alter a state of a second parameter in said backend component, wherein said backend component is configured to store said states of said first and second parameters and combine said states of said first and second parameters to generate a query, wherein said query defines said configuration of said first view;
    (d) navigating to a second view of said web-based application that displays at least a portion of said digital content, and executing said injected script to renders said plurality of graphical elements within said second view to receive a user input indicative of an altered state of a parameter to generate an updated query for defining an updated configuration of said first view, wherein said updated query is automatically populated in a search field in said second view indicative of said updated configuration of said first view; and
    (e) upon returning to said first view, automatically updating a display of said digital content within said first view based at least in part on said updated configuration.

2. The method of claim 1, wherein said existing web-based application comprises an electronic mail (email), a chat application, a content management application, an enterprise management tool, or a task management application.

3. The method of claim 1, wherein said existing web-based application is an email application that is displayed with said plurality of graphical elements including a plurality of buttons.

4. The method of claim 3, wherein said plurality of graphical elements include a plurality of buttons and wherein said plurality of buttons correspond to configuring the display of emails by dates, importance or tags.

5. The method of claim 3, wherein said first input and said second input are received via two of said buttons for displaying said digital content based on said stored states and said first and second parameters corresponding to said two buttons.

6. The method of claim 1, wherein said multiple states comprise inclusion, exclusion and off.

7. The method of claim 1, wherein said backend component is configured to execute said updated query for retrieving a query result for displaying said digital content according to said updated configuration of said first view.

8. The method of claim 1, wherein said stored states of said first and second parameters are used to add a combo graphical element within said first view and wherein said combo graphical element activates said first graphical element and said second graphical element within said first view in response to receiving an input for.

9. The method of claim 1, wherein said search field is further displayed in said first view.

10. A non-transitory computer-readable medium comprising machine-executable instructions that, upon execution by one or more computer processors, implements a method for configuring a view of a web-based application for visualizing digital content, said method comprising:
   (a) injecting, via an injector, a script executable by a browser to integrate a user interface component and a backend component into an existing web-based application, wherein said user interface component comprises one or more user interface (UI) features that are not in said existing web-based application;
   (b) executing said injected script to render said one or more UI features of said user interface component within said existing web-based application, wherein said one or more UI features comprises a plurality of graphical elements and wherein each of the plurality of graphical elements corresponds to a parameter of the digital content and is configured to receive a user input to select a state from multiple states of a corresponding parameter;
   (c) using said plurality of graphical elements to define a configuration for a first view of said web-based application by:
      i) receiving a first input via a first graphical element from said plurality of graphical elements within said first view to alter a state of a first parameter in said backend component,
      ii) receiving a second input via a second graphical element within said first view to alter a state of a second parameter in said backend component, wherein said backend component is configured to store said states of said first and second parameters and combine said states of said first and second parameters to generate a query, wherein said query defines said configuration of said first view;
   (d) navigating to a second view of said web-based application that displays at least a portion of said digital content, and executing said injected script to render said plurality of graphical elements within said second view to receive a user input indicative of an altered state of a parameter to generate an updated query for defining an updated configuration of said first view, wherein said updated query is automatically populated in a search field in said second view indicative of said updated configuration of said first view; and
   (e) upon returning to said first view, automatically updating a display of said digital content within said first view based at least in part on said updated configuration.

11. The non-transitory computer-readable medium of claim 10, wherein said existing web-based application comprises an electronic mail (email), a chatting application, a content management application, an enterprise management tool, or a task management application.

12. The non-transitory computer-readable medium of claim 10, wherein said plurality of graphical elements include a plurality of buttons.

13. The non-transitory computer-readable medium of claim 10, wherein said existing web-based application is an email application that is displayed with said plurality of graphical elements including a plurality of buttons.

14. The non-transitory computer-readable medium of claim 13, wherein said plurality of buttons correspond to configuring the display of emails by dates, importance or tags.

15. The non-transitory computer-readable medium of claim 13, wherein said first input and said second input are received via two of said buttons for displaying said digital content based on said stored states and said first and second parameters corresponding to said two buttons.

16. The non-transitory computer-readable medium of claim 10, wherein said multiple states comprise inclusion, exclusion and off.

17. A system for configuring a view of a web-based application for visualizing digital content, said system comprising a computer comprising one or more computer processors that are individually or collectively programmed to:
   (a) inject via an injector, a script executable by a browser to integrate a user interface component and a backend component into an existing web-based application, wherein said user interface component comprises one or more user interface (UI) features that are not in said existing web-based application;
   (b) execute said injected script to render said one or more UI features of said user interface component within said existing web-based application, wherein said one or more UI features comprises a plurality of graphical elements and wherein each of the plurality of graphical elements corresponds to a parameter of the digital content and is configured to receive a user input to select a state from multiple states of a corresponding parameter;
   (c) use said plurality of graphical elements to define a configuration for a first view of said web-based application by
      i) receiving a first input via a first graphical element from said plurality of graphical elements within said first view to alter a state of a first parameter in said backend component,
      ii) receiving a second input via a second graphical element within said first view to alter a state of a second parameter in said backend component, wherein said backend component is configured to store said states of said first and second parameters and combine said states of said first and second parameters to generate a query, wherein said query defines said configuration of said first view;
   (d) navigate to a second view of said web-based application that displays at least a portion of said digital content, and execute said injected script to render said plurality of graphical elements within said second view to receive a user input indicative of an altered state of a parameter to generate an updated query defining an updated configuration of said first view, wherein said updated query is automatically populated in a search field in said second view indicative of said updated configuration of said first view; and
   (e) upon returning to said first view, automatically update a display of said digital content within said first view based at least in part on said updated configuration.

18. The system of claim 17, wherein said plurality of graphical elements include a plurality of buttons.

19. The system of claim 18, wherein said first input and said second input are received via two of said buttons for displaying said digital content based on said stored states and said first and second parameters corresponding to said two buttons.

20. The system of claim 17, wherein said multiple states comprise inclusion, exclusion and off.

* * * * *